United States Patent [19]

Diery et al.

[11] 4,420,413

[45] Dec. 13, 1983

[54] OXYALKYLATED ADDITION PRODUCTS FROM ETHYLENE OXIDE-PROPYLENE OXIDE BLOCK POLYMERS AND BIS-GLYCIDYL ETHERS AND THEIR USE

[75] Inventors: Helmut Diery, Kelkheim; Martin Hille, Liederbach, both of Fed. Rep. of Germany

[73] Assignee: Hoechst Aktiengesellschaft, Fed. Rep. of Germany

[21] Appl. No.: 332,968

[22] Filed: Dec. 21, 1981

[30] Foreign Application Priority Data

Dec. 30, 1980 [DE] Fed. Rep. of Germany ....... 3049450

[51] Int. Cl.$^3$ ................ B01D 17/04; C08L 63/00
[52] U.S. Cl. ........................... 252/331; 166/268;
252/8.55 R; 252/319; 252/345; 525/523;
525/407
[58] Field of Search ............... 525/407, 523; 423/456;
252/331, 319, 345

[56] References Cited

U.S. PATENT DOCUMENTS

| | | | |
|---|---|---|---|
| 2,792,357 | 5/1957 | DeGroote | 525/523 |
| 2,864,806 | 12/1958 | DeGroote | 525/523 |
| 3,544,655 | 12/1970 | Booth | 525/523 |
| 3,655,815 | 4/1972 | Salyer | 525/407 |
| 3,687,894 | 9/1972 | Collings | 525/523 |
| 4,125,382 | 11/1978 | O'Brien | 252/331 |
| 4,326,968 | 4/1982 | Blair | 252/331 |
| 4,326,984 | 4/1982 | Blair | 252/331 |

FOREIGN PATENT DOCUMENTS 2054699  2/1981  United Kingdom .

*Primary Examiner*—Paul Lieberman
*Attorney, Agent, or Firm*—Connolly and Hutz

[57] ABSTRACT

Oxyalkylated addition products from ethylene oxide-propylene oxide block polymers and bis-glycidyl ethers, obtained by the addition of ethylene oxide-propylene oxide block polymers of the formula

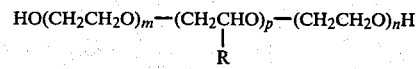

wherein R denotes methyl or ethyl, n and m are numbers which are so chosen that the content of polyethylene oxide groups is 5 to 80% of the molecular weight of the block polymer, and p is a number larger than 10, to bis-glycidyl ethers of the formula

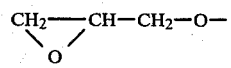

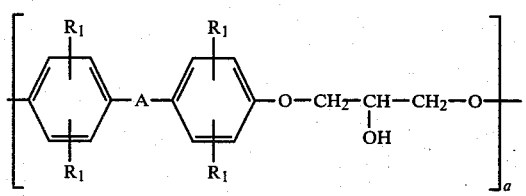

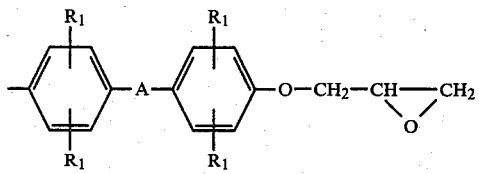

wherein the $R^1$'s can be identical or different and denote hydrogen, $C_1$-$C_4$-alkyl or halogen, in particular chlorine, A denotes a direct bond, a sulfonyl or cyclohexyl group or a group of the formula

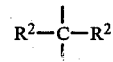

$R^2$ denotes hydrogen, methyl or phenyl, and a denotes an integer from 0 to 10, and subsequent oxyalkylation with propylene oxide or butylene oxide and, if appropriate, ethylene oxide, the amount of propylene oxide or butylene oxide which is added last being 1 to 90% by weight of the total molecule and the amount of ethylene oxide which, optionally, has also been added, being 50% by weight of the total molecule. These addition compounds are used for breaking crude oil emulsions.

3 Claims, No Drawings

OXYALKYLATED ADDITION PRODUCTS FROM ETHYLENE OXIDE-PROPYLENE OXIDE BLOCK POLYMERS AND BIS-GLYCIDYL ETHERS AND THEIR USE

The largest part of all the crude oil extracted is obtained in the form of a water-in-oil emulsion. Virtually pure crude oil is only produced in the initial phase of the life of an oil field. The water content of crude oil then rises after a certain time, usually beginning with the wells located at the perimeter of the oil field. Prior to transport, the water must be separated off or lowered below an acceptable concentration. This is usually effected by the addition of small amounts of surfactants, called demulsifiers or emulsion breakers, most crude oils being heated up. Good demulsifiers lower the water content of the crude oil, the oil content of the water separated off and the content of salt and also ash in the crude oil to the values required, whilst being used in the lowest possible concentrations and at low temperatures and also for a short treatment time. Crude oils differ considerably around the world and therefore many types of emulsion breakers are used for achieving optimum demulsifying results. Owing to the large amounts of crude oil emulsions which arise and which have to be processed, there is therefore a considerable interest in improved demulsifiers, because even a small decrease in the processing temperature, the content of salt and water in the crude oil, or the oil content in the water yields significant economic benefits.

The demulsification of crude oils by means of products from a reaction of alkylene oxides with alkylphenol-formaldehyde resins is widely used. Products of this type are disclosed, for example in U.S. Pat. Nos. 2,499,368, 2,499,370, 2,524,889, 2,560,333 and 2,574,543. The next largest group of demulsifiers are block and mixed polymers formed from propylene oxide and ethylene oxide, for example in accordance with French Patent Specification No. 1,069,615 and German Auslegeschrift No. 1,018,179. Effective demulsifiers are also obtained by crosslinking block and mixed polymers formed from propylene oxide and ethylene oxide with one another and with oxyalkylated alkylphenol-formaldehyde resins. Compounds such as phosphorus chlorides, diisocyanates, dicarboxylic acids and phenol-formaldehyde resin structures serve as the crosslinking agent for this purpose.

It has now been found that oxyalkylated addition products formed from ethylene oxide-propylene oxide block polymers and bis-glycidyl ethers yield better demulsification results than the demulsifiers known hitherto.

The invention thus relates to oxyalkylated addition products formed from ethylene oxide-propylene oxide block polymers and bis-glycidyl ethers, which are obtained by the addition of ethylene oxide-propylene oxide block polymers of the formula $$HO(CH_2CH_2O)_m-(CH_2CHO)_p-(CH_2CH_2O)_nH$$
$$\phantom{HO(CH_2CH_2O)_m-(CH_2CH}|$$
$$\phantom{HO(CH_2CH_2O)_m-(CH_2CH}R$$

wherein R denotes methyl or ethyl, n and m are numbers which are so chosen that the content of polyethylene oxide groups constitutes 5 to 80% of the molecular weight of the block polymer and p is a number larger than 10, to bis-glycidyl ethers of the formula

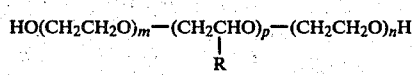

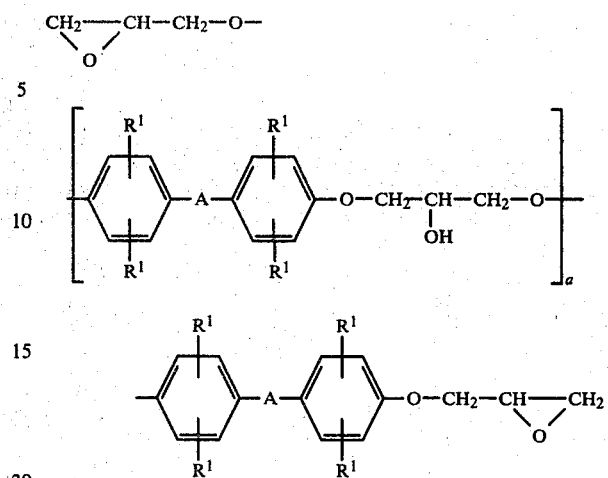

wherein the $R^1$'s can be identical or different and denote hydrogen, $C_1$-$C_4$-alkyl or halogen, in particular chlorine, A denotes a direct bond, a sulfonyl or cyclohexyl group or a group of the formula

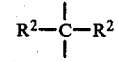

$R^2$ denotes hydrogen, methyl or phenyl and a denotes an integer from 0 to 10, and a subsequent oxyalkylation with propylene oxide or butylene oxide and, if appropriate, ethylene oxide, the amount of the propylene oxide or butylene oxide which is added last being 1 to 90% by weight of the total molecule, preferably 25–75% by weight, and the amount of ethylene oxide, which, optionally, has also been added, being up to 50% by weight of total molecule.

The products used as ethylene oxide-propylene oxide block polymers are those which are prepared by oxyethylating a polypropylene oxide having a molecular weight of at least 600. The preferred starting product for this preparation is a polypropylene oxide having a molecular weight of 1,000 to 3,500. Some of the propylene oxide can also be replaced by butylene oxide. The content of polyethylene oxide groups in the total molecule of the block polymer is so chosen that it constitutes at least 5%, but preferably 10 to 80%.

The bis-glycidyl ethers are obtained by a known method from the corresponding bisphenols. Inter alia, the following bisphenols are suitable for this purpose: bis-(4-hydroxyphenyl)-methane, bis-(4-hydroxy-3-methylphenyl)-methane, bis-(4-hydroxy-3,5-dichlorophenyl)-methane, 1,1-bis-(4-hydroxyphenyl)-ethane, 2,2-bis-(4-hydroxyphenyl)-propane, 2,2-bis-(4-hydroxy-3-methylphenyl)-propane, 2,2-bis-(4-hydroxy-3-chlorophenyl)-propane, 2,2-bis-(4-hydroxy-3,5-dichlorophenyl)-propane, bis-(4-hydroxyphenyl)-phenylmethane, bis-(4-hydroxyphenyl)-diphenylmethane, 1,1-bis-(4-hydroxyphenyl)-cyclohexyl, 4,4'-dihydroxydiphenyl and 4,4'-dihydroxydiphenyl sulfone.

In addition, epoxy resins in accordance with the formula given above are also possible bis-glycidyl ethers.

The reaction of the ethylene oxide-propylene oxide block polymers with the bis-glycidyl ethers is effected at temperatures between 70° and 160° C., preferably 80° to 120° C. The reaction is in general carried out without solvents, but it is also possible to carry it out in an inert organic solvent. The molar ratio of the propylene oxide-ethylene oxide block polymers to the bisepoxide is 1:0.6 to 1:1, with the proviso that the ratio of 1:1 is not exceeded because of the occurrence of crosslinking reactions and the associated formation of gelatinous products. Here it can be advantageous to add the total amount of bisepoxide in two to three portions during the course of the reaction. The reaction is carried out in the presence of a catalyst which has an alkaline reaction or of a Lewis acid. If the block polymer still contains, in the form of the neutralized salt, the alkaline catalyst necessary for its preparation, for example sodium hydroxide, potassium hydroxide or sodium methylate, this salt acts as a catalyst for the reaction with the bisepoxide. In this case it is not necessary to make a fresh addition of a catalyst. However, if the block polymer, after its preparation, was freed from the catalyst, a fresh addition of a catalyst of the type mentioned is necessary. The time for the reaction depends on the reaction temperature. The reaction is carried out until an epoxide number of less than 1 to 2 has been reached.

The addition products thus obtained are then oxyalkylated with an alkylene oxide, preferably propylene oxide. However, all or some of the propylene oxide can also be replaced by butylene oxide. In order to match the differing properties of the crude oil emulsions to be demulsified it can be advantageous to oxyalkylate the addition product also with ethylene oxide in addition to propylene oxide and butylene oxide. It is possible to proceed here, as is known for mixed oxyalkylations of this type, by three different methods. It is thus possible to add first the total amount of propylene oxide and then to oxyalkylate with ethylene oxide or, vice versa, initially the total amount desired of ethylene oxide is added and only then the total amount of propylene oxide. It is also possible to carry out the oxyalkylation of the addition product in one step with a mixture of the desired amount of propylene oxide and ethylene oxide.

The amount of propylene oxide or butylene oxide used is such that the content of this alkylene oxide which is added in the last step is 1 to 90% relative to the molecular weight of the addition product to be oxyalkylated. If, additionally, ethylene oxide is also added in the last step, the amount of ethylene oxide can constitute up to 50% relative to the molecular weight of the addition product inclusive of the contents of the propylene oxide or butylene oxide added on at the end. The oxyalkylation is carried out in every case under the customary conditions using alkali as catalyst. It can be carried out without pressure or preferably in pressure vessels. In the latter case the operating pressure is 2 to 8 bars.

The demulsifiers according to the invention have better emulsifying results for various crude oil emulsions than can be achieved with previously known emulsion breakers. The superiority over conventional demulsifiers is particularly significant in respect of the lowering of the residual salt content in the crude oil. These new demulsifiers can be used as such directly or in the form of solutions which have been diluted with organic solvents in a ratio of 1:200. The concentration at which the demulsifiers are used in the crude oil emulsions to be broken is in general between 2 and 400, preferably 5 and 50, ppm.

The Examples A-H below describe first the preparation of the addition products, which act as starting products for the oxyalkylation products according to the invention, from bisepoxides and bisphenols or epoxide resins and ethylene oxide-propylene oxide block polymers.

EXAMPLES FOR THE PREPARATION OF THE STARTING PRODUCTS

EXAMPLE A 561 parts by weight of an ethylene oxide-propylene oxide block polymer having a polypropylene oxide block which has a molecular weight of about 1,800 and 40% of polyethylene oxide in the total molecule (Genapol PF 40 ®) (average molecular weight 2,805 as calculated from the OH number of 40) and 45.1 parts by weight of a bis-glycidyl ether from bisphenol A (molecular weight 376 as calculated from the epoxide number) are introduced into a cylindrical 1 liter flask having a flat ground joint and equipped with a horseshoe stirrer, an internal thermometer and a condenser which has a $CaCl_2$ seal against moisture. After stirring for ½ an hour at room temperature, the internal temperature (ti) is raised to 80° C. After 8 hours a second portion of 18.8 parts by weight of the bisglycidyl ether is added, and stirring is continued for a further 8 hours at ti=80° C. and then for another 8 hours at ti=110° C. The total reaction time is 24 hours. This lowers the epoxide number of the mixture to below 1-2. The cloud point is 64°-65° C. (measured in butyldiglycol/water in accordance with DIN No. 53,917).

EXAMPLE B (a) In a 2 liter flask having a flat ground joint and equipped with a horseshoe stirrer, a condenser and an internal thermometer, 0.208 part by weight of $BF_3$ etherate are added to 623.2 parts by weight of a block polymer having a polypropylene oxide block which has a molecular weight of 1,750 and 40% of polyethylene oxide in the total molecule (trade name Pluriol PE 6400 ®, having a molecular weight of 3,116 as calculated from the OH number) and the mixture is stirred for 15 minutes at room temperature. 67.9 parts by weight of a bis-glycidyl ether from bisphenol A (molecular weight 376) are then added and the mixture is stirred for 10 hours at 120° C. A yellow, clear, medium-viscous liquid is obtained, the epoxide number of which is about 1. The cloud point, as measured in accordance with DIN No. 53,917, is 41° C.

(b) If the reaction is carried out by using 8.2 parts by weight of sodium stearate, instead of boron trifluoride etherate, and by stirring for 15 hours at 140° C., a turbid, reddish brown reaction product is obtained, which can be filtered hot, with the addition of 10 parts by weight of Celite ®, to give a clear liquid. The cloud point, as measured according to DIN No. 53,917, is 61° C. and the epoxide number is smaller than 1.

EXAMPLE C

If in Example B/a the bis-glycidyl ether from bisphenol A is replaced by 336.8 parts by weight of an epoxide resin of the formula

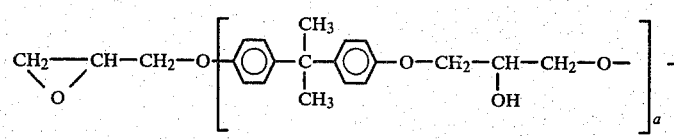 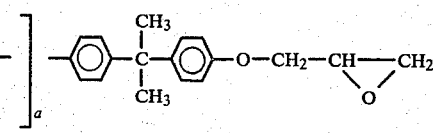

a being 5-6 and the epoxide number being 39, and stirring is carried out for 28 hours at 120° C., an epoxide number of 4-5 is achieved. Another addition of 0.2 part by weight of boron trifluoride etherate and a further reaction for 8 hours at 120° C. lower the epoxide number to below 1. A yellow, highly viscous liquid is obtained. The cloud point, as measured in accordance with DIN No. 53,917, is 45° C.

EXAMPLE D

On replacing the epoxide resin in Example C by 168.4 parts by weight of an epoxide resin having an epoxide number of 77-78 (a≈2.4) and stirring for 28 hours at 120° C., with an addition of 0.2 part by weight of boron trifluoride etherate, a clear, yellowish, highly viscous liquid is obtained.

The cloud point, as measured in accordance with DIN No. 53,917, is 45° C.

EXAMPLE E (a) 975.6 parts by weight of an ethylene oxide-propylene oxide block polymer having a polypropylene oxide block which has a molecular weight of about 1,600 and 20% of polyethylene oxide in the total molecule (trade name Genapol PF 20 ®) and 89.3 parts by weight of a bis-glycidyl ether from bisphenol A (epoxide number 196) are stirred for 8 hours at 80° C. in a 2 liter flask having a flat ground joint and equipped as in Example B/a. A further amount of 37.2 parts by weight of the bis-glycidyl ether are added and the reaction is continued for 8 hours at 80° C. and 8 hours at 110° C. The liquid reaction product has an epoxide number smaller than 1.

The cloud point, as measured in accordance with DIN No. 53,917, is 51° C.

(b) The block polymer used in Example E/a is replaced by 2,301.6 parts by weight of an ethylene oxide-propylene oxide block polymer having 80% of polyethylene oxide in the total molecule (trade name Genapol PF 80 ® and an OH number of 19-20). The reaction time at 110° C. is here extended to 18 hours. The white, waxy reaction product has an epoxide number of ≈1.

The cloud point, as measured in accordance with DIN No. 53,917, is 90° C.

EXAMPLE F 561 parts by weight of an ethylene oxide-propylene oxide block polymer as in Example A and 224.6 parts by weight of an epoxide resin (Example C with a being 5-6) having an epoxide number of 39 are introduced and stirred slowly for 24 hours at 80° C. in a 2 liter flask, having a flat ground joint as in Example B/a. This lowers the epoxide number to 1 and a highly viscous product is obtained, which is then subjected to a reaction with propylene oxide (Example 7 below).

EXAMPLE G 437.5 parts by weight of an ethylene oxide-propylene oxide block polymer having a polypropylene oxide block which has a molecular weight of 3,500 and 60% of polyethylene oxide in the total molecule and 67.0 parts by weight of a bis-glycidyl ether from bisphenol A (molecular weight 372 as calculated from the epoxide number) are stirred for 8 hours at ti=80° C. in a 1 liter flask, having a flat ground joint, as described in Example A. A further 27.9 parts by weight of the bis-glycidyl ether are then added. The reaction is completed by stirring for 8 hours at 80° C. and for 8 hours at 110° C. The light brown waxy reaction product has an epoxide number of 3.

The cloud point, as measured in accordance with DIN No. 53,917, is 85° C.

EXAMPLE H 5.4 parts by weight of sodium isostearate are added to 411.6 parts by weight of a block polymer having a polypropylene oxide block which has a molecular weight of 1,750 and 10% of polyethylene oxide in the total molecule (trade name Pluriol PE 6100 ®) in the apparatus of Example B. 67.0 parts by weight of a bis-glycidyl ether from bisphenol A are then added and the mixture is stirred for 32 hours at 140° C. This lowers the epoxide number of the liquid reaction product to 1.

Examples for the preparation of the compounds according to the invention

EXAMPLE 1

(a) 4,454 parts by weight of the addition product prepared in accordance with Example A and 22.3 parts by weight of a 30% strength methanolic sodium methylate solution are introduced into a 30 liter V4A stainless steel autoclave equipped with devices for stirring and temperature measurement and the apparatus is flushed with nitrogen. 4,774 parts by weight of propylene oxide are injected in the course of 4 hours at ti=160°-180° C. and at a pressure of 4-5 bars and the resulting mixture is then stirred for one hour at ti=150°-160° C. The reaction product of the oxypropylation contains 51.7% of polypropylene oxide and it is adjusted by means of 15 parts by weight of glacial acetic acid to a pH of 7.

The cloud point, as measured in accordance with DIN No. 53,917, is 35° C.

(b) If 2,880 parts by weight of the addition product from Example A are oxypropylated with 620 parts by weight of propylene oxide under the same conditions as in Example 1a, the red brown liquid reaction product contains 17.7% of polypropylene oxide.

The cloud point, as measured in accordance with DIN No. 53,917, is 63°-64° C.

(c) 2,880 parts by weight of the reaction product from Example A are oxyalkylated as in Example 1a with a mixture of 635 parts by weight of ethylene oxide and 1,785 parts by weight of propylene oxide in the presence of 24 parts by weight of a 30% strength sodium methylate solution. The reaction product contains 13.6% of ethylene oxide and 37.0% of propylene oxide, this represents 50.6% of ethylene oxide-propylene oxide as mixed oxyalkylate, and it is a red brown liquid.

The cloud point, as measured in accordance with DIN No. 53,917, is 50° C.

EXAMPLE 2

(a) 435 parts by weight of the reaction product from Example E/a and 2 parts by weight of a 30% strength Na methylate solution in methanol are introduced into a 2 liter V4A stainless steel autoclave having a device for stirring and an internal thermometer. 180 parts by weight of propylene oxide are injected in the course of 30 minutes at ti=160°–170° C. and at a pressure of 4–5 bars and the mixture is then stirred for 1 hour. The brown medium-viscous reaction product contains 29.2% of polypropylene oxide.

The cloud point, as measured in accordance with DIN No. 53,917, is about 38° C.

(b) 354 parts by weight of the starting product used in Example 2a are reacted under the same conditions as in Example 2a with 312 parts by weight of propylene oxide, so that an oxypropylation product having 46.8% of polypropylene oxide is obtained.

The cloud point, as measured in accordance with DIN No. 53,917, is about 28° C.

EXAMPLE 3

(a) 300 parts by weight of the reaction product from Example E/b are reacted with 314 parts by weight of propylene oxide in the oxyalkylation apparatus of Example 2. A brown soft solid product is obtained, which contains 51.1% of polypropylene oxide.

The cloud point, as measured in accordance with DIN No. 53,917, is about 18° C.

(b) If the procedure of Example 3a is followed and sufficient propylene oxide is added to give a reaction product having 75.0% of polypropylene oxide, a brown paste is obtained which has a cloud point, as measured in accordance with DIN No. 53,917, of about 10° C.

EXAMPLE 4

(a) 547 parts by weight of the oxypropylation product prepared in accordance with Example 1a and 2 parts by weight of sodium methylate are introduced into the oxyalkylation apparatus of Example 2. 96.5 parts by weight of ethylene oxide are fed in at ti=160°–180° C., so that the final product contains an additional amount of 15.0% of polyethylene oxide in the total molecule. The reaction product is a moderately viscous liquid.

The cloud point, as measured in accordance with DIN No. 53,917, is 38° C.

(b) If the procedure of Example 4a is followed and sufficient ethylene oxide is added on so that the final product contains 29.3% of polyethylene oxide, a liquid product is obtained which has a cloud point, measured in accordance with DIN No. 53,917, of 53° C.

(c) If the oxyethylation is carried out as in Example 4a with a sufficient amount of ethylene oxide to produce an additional polyethylene oxide content of 46.5% in the final product, a product of pasty consistency is obtained. The cloud point, as measured in accordance with DIN No. 53,917, is 71° C.

EXAMPLE 5

In the 2 liter V4A stainless steel oxyalkylation apparatus of Example 2, 319 parts by weight of the reaction product of Example C are reacted in the presence of 10 parts by weight of a 30% strength sodium methylate solution in methanol with 123 parts by weight of propylene oxide, in the course of 1 hour and 45 minutes at ti=160°–170° C. and under 4–5 bars. After stirring for another hour, a liquid viscous reaction product is obtained, which contains 27.8% of polypropylene oxide. The cloud point, as measured in accordance with DIN No. 53,917, is 32° C.

EXAMPLE 6

256 parts by weight of the reaction product of Example D are reacted under the same conditions as in Example 5, in the presence of 8 parts by weight of a 30% strength sodium methylate solution in methanol, with 106 parts by weight of propylene oxide. The liquid reaction product contains 29.2% of polypropylene oxide.

The cloud point, as measured in accordance with DIN No. 53,917, is 43° C.

EXAMPLE 7

In the 2 liter V4A stainless steel apparatus of Example 2, 365 parts by weight of the reaction product of Example F are reacted, in the presence of 5 parts by weight of a 30% strength methanolic Na methylate solution, with 161 parts by weight of propylene oxide, under the customary conditions. The liquid reaction product contains 30.6% of polypropylene oxide and, on determining the cloud point, in accordance with DIN No. 53,917, is still turbid at −5° C.

EXAMPLE 8

350 parts by weight of the reaction product of Example B/a are reacted, in the presence of one part by weight of pulverulent sodium hydroxide and under pressure, with 110 parts by weight of propylene oxide. The liquid reaction product contains 23.9% of polypropylene oxide and has a cloud point of 34.2° C. (in accordance with DIN No. 53,917).

EXAMPLE 9

476 parts by weight of the addition product prepared in accordance with Example A and 4.8 parts by weight of a 30% strength methanolic Na methylate solution are introduced into the oxyalkylation apparatus of Example 2. The contents are subjected to an oxyalkylation reaction, in the customary manner, with a mixture of 357 parts by weight of propylene oxide and 131 parts by weight of ethylene oxide, at ti=160°–170° C. and under 4–5 bars, in the course of 1 hour. The red brown clear liquid final product contains 36.8% of propylene oxide and 13.5% of ethylene oxide as mixed oxyalkylate.

The cloud point, as measured in accordance with DIN No. 53,917, is 50° C.

EXAMPLE 10

424 parts by weight of the addition product prepared in accordance with Example A are reacted, in the presence of 7.0 parts by weight of a Na methylate solution (30% strength in methanol), the methanol being distilled off in vacuo, under the customary conditions with 136 parts by weight of isobutylene oxide (2,2-dimethyloxirane) in the oxyalkylation apparatus of Example 2. The reaction product contains 24.2% of polybutylene oxide. On neutralizing with glacial acetic acid to a pH of 6.1, a soft paste is obtained, which gives a milky-turbid solution in water.

EXAMPLE 11

If 364 parts by weight of the reaction product prepared in accordance with Example A are reacted, under the same conditions, with 375 parts by weight of n-butylene oxide (n-butylene-1,2-oxide) and an adjustment with glacial acetic acid to give a pH value of 6.5 is then carried out, a clear liquid reaction product is obtained which gives a turbid solution in water. The reaction product contains 50.6% of polybutylene oxide.

EXAMPLE 12

389 parts by weight of the addition product obtained in accordance with Example G are reacted, in the presence of 5 parts by weight of Na methylate solution (30% strength in methanol), with 382 parts by weight of propylene oxide under the conditions described in the above examples. The reaction product contains 49.2% of polypropylene oxide and is a brown paste. The cloud point, as measured in accordance with DIN No. 53,917, is 24° C.

EXAMPLE 13

221 parts by weight of the addition product prepared in accordance with Example H are oxypropylated with 198 parts by weight of propylene oxide, under the customary conditions. The reaction product, neutralized with glacial acetic acid, is red brown and water-insoluble.

USE EXAMPLES

The tables below show the results obtained on using the products according to the invention of Examples 1 to 13 for the breaking of three different crude oil emulsions.

In each case, 50% strength solutions of the demulsifiers in methanol were used, because the pure substances are highly viscous substances which can be metered exactly only with difficulty. Because the amounts used are very small, the addition of the 50% strength solutions is carried out by means of precision metering instruments. The experimental tables indicate in % against time the water quantities separated off from the emulsions. The absolute water content of the emulsions was first determined by the Dean-Rusk method. The individual tables indicate the quantity metered in the water content of the emulsion, the demulsification temperature and the provenance of the crude oil emulsion.

TABLE 1

Demulsification temperature: 35° C.
Water content of the emulsion: 56%
Quantity metered in: 40 ppm
Provenance: Federal Republic of Germany/Ems region

| | Minutes | | | | | |
|---|---|---|---|---|---|---|
| Example | 15 | 30 | 45 | 60 | 100 | 200 |
| 1 a | 28 | 58 | 87 | 100 | 100 | 100 |
| 1 b | 8 | 28 | 51 | 78 | 90 | 96 |
| 1 c | 9 | 32 | 56 | 76 | 92 | 97 |
| 2 a | 18 | 42 | 63 | 82 | 94 | 100 |
| 2 b | 25 | 53 | 79 | 91 | 100 | 100 |
| 3 a | 6 | 24 | 45 | 58 | 77 | 90 |
| 3 b | 3 | 20 | 42 | 54 | 72 | 88 |
| 4 a | 16 | 40 | 65 | 85 | 97 | 100 |
| 4 b | 10 | 34 | 56 | 81 | 94 | 98 |
| 4 c | 8 | 24 | 38 | 58 | 72 | 88 |
| 5 | 12 | 38 | 58 | 79 | 87 | 97 |
| 6 | 9 | 35 | 52 | 76 | 85 | 94 |
| 7 | 8 | 34 | 56 | 75 | 82 | 94 |
| 8 | 15 | 38 | 58 | 78 | 92 | 98 |
| 9 | 22 | 40 | 62 | 80 | 93 | 100 |
| 10 | 12 | 32 | 52 | 78 | 92 | 96 |
| 11 | 8 | 26 | 46 | 68 | 84 | 82 |
| 12 | 14 | 32 | 52 | 74 | 96 | 100 |

TABLE 1-continued

Demulsification temperature: 35° C.
Water content of the emulsion: 56%
Quantity metered in: 40 ppm
Provenance: Federal Republic of Germany/Ems region

| | Minutes | | | | | |
|---|---|---|---|---|---|---|
| Example | 15 | 30 | 45 | 60 | 100 | 200 |
| 13 | 18 | 50 | 77 | 90 | 100 | 100 |

TABLE 2

Demulsification temperature: 30° C.
Water content of the emulsion: 42%
Quantity metered in: 20 ppm
Provenance: Saudi Arabia, light

| | Minutes | | | | | |
|---|---|---|---|---|---|---|
| Example | 15 | 30 | 45 | 60 | 100 | 200 |
| 1 a | 24 | 52 | 82 | 94 | 100 | 100 |
| 1 b | 16 | 28 | 42 | 62 | 82 | 94 |
| 1 c | 14 | 26 | 44 | 58 | 80 | 92 |
| 2 a | 18 | 44 | 70 | 85 | 95 | 98 |
| 2 b | 20 | 46 | 74 | 88 | 97 | 100 |
| 3 a | 12 | 22 | 32 | 52 | 72 | 84 |
| 3 b | 10 | 20 | 34 | 50 | 70 | 88 |
| 4 a | 20 | 42 | 68 | 82 | 93 | 98 |
| 4 b | 20 | 46 | 65 | 78 | 88 | 96 |
| 4 c | 14 | 20 | 32 | 51 | 72 | 86 |
| 5 | 16 | 28 | 42 | 58 | 72 | 90 |
| 6 | 16 | 22 | 38 | 57 | 76 | 92 |
| 7 | 18 | 26 | 44 | 60 | 79 | 94 |
| 8 | 16 | 40 | 72 | 82 | 90 | 96 |
| 9 | 18 | 42 | 68 | 84 | 93 | 98 |
| 10 | 12 | 34 | 62 | 76 | 86 | 95 |
| 11 | 10 | 32 | 56 | 72 | 83 | 92 |
| 12 | 18 | 40 | 65 | 78 | 88 | 97 |
| 13 | 26 | 58 | 82 | 95 | 100 | 100 |

TABLE 3

Demulsification temperature: 45° C.
Water content of the emulsion: 42%
Quantity metered in: 50 ppm
Provenance: Persia

| | Minutes | | | | | |
|---|---|---|---|---|---|---|
| Example | 15 | 30 | 45 | 60 | 100 | 200 |
| 1 a | 28 | 58 | 80 | 93 | 100 | 100 |
| 1 b | 18 | 32 | 58 | 74 | 88 | 98 |
| 1 c | 16 | 28 | 62 | 74 | 86 | 94 |
| 2 a | 20 | 48 | 72 | 91 | 96 | 98 |
| 2 b | 25 | 56 | 78 | 92 | 98 | 100 |
| 3 a | 12 | 23 | 36 | 54 | 76 | 92 |
| 3 b | 16 | 28 | 44 | 62 | 78 | 88 |
| 4 a | 22 | 52 | 74 | 88 | 94 | 100 |
| 4 b | 18 | 30 | 54 | 72 | 84 | 95 |
| 4 c | 12 | 22 | 38 | 56 | 78 | 90 |
| 5 | 15 | 45 | 66 | 80 | 90 | 96 |
| 6 | 18 | 43 | 70 | 78 | 86 | 95 |
| 7 | 20 | 48 | 68 | 76 | 88 | 96 |
| 8 | 20 | 46 | 72 | 86 | 93 | 98 |
| 9 | 16 | 38 | 68 | 83 | 90 | 97 |
| 10 | 12 | 32 | 62 | 72 | 82 | 85 |
| 11 | 10 | 30 | 60 | 69 | 79 | 93 |
| 12 | 24 | 58 | 77 | 90 | 95 | 100 |
| 13 | 28 | 62 | 82 | 94 | 100 | 100 |

We claim:
1. An oxyalkylated addition product, said addition product being formed from the components consisting essentially of an ethylene oxide-propylene oxide block polymer and a bis-glycidyl ether, said addition product being obtained by the addition of an ethylene oxide-propylene oxide block polymer of the formula

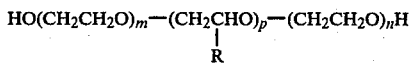

in which R denotes methyl or ethyl, n and m are numbers which are so chosen that the content of polyethylene oxide groups constitutes 5 to 80% of the molecular weight of the block polymer and p is a number larger than 10, to a bis-glycidyl ether of the formula

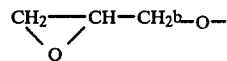

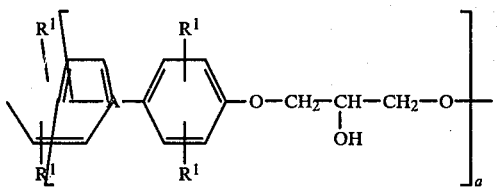

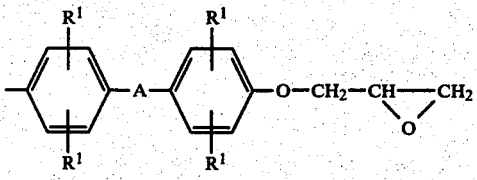

in which the $R^1$'s can be identical or different and denote hydrogen, $C_1$-$C_4$-alkyl or halogen, in particular chlorine, A denotes a direct bond, a sulfonyl or cyclohexyl group or a group of the formula

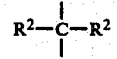

$R^2$ denotes hydrogen, methyl or phenyl and a is an integer from 0 to 10, said addition product being subsequently oxyalkylated with propylene oxide or butylene oxide and 0-50% ethylene oxide, the amount of the propylene oxide or butylene oxide which is added last being 1 to 90% by weight of the total molecule, the amount of the ethylene oxide, which may have also been added, being up to 50% by weight of the total molecule.

2. An oxyalkylated addition product according to claim 1, wherein, when an $R^1$ is halogen, said halogen is chlorine.

3. A method for breaking crude oil emulsions comprising the step of using an oxyalkylated addition product of claim 1 in said method.

* * * * *

UNITED STATES PATENT AND TRADEMARK OFFICE
CERTIFICATE OF CORRECTION

PATENT NO. : 4,420,413
DATED : December 13, 1983
INVENTOR(S) : DIERY ET AL

It is certified that error appears in the above-identified patent and that said Letters Patent are hereby corrected as shown below:

In claim 1, column 11, lines 21-34, and column 12, lines 1-9, the structural formula should read:

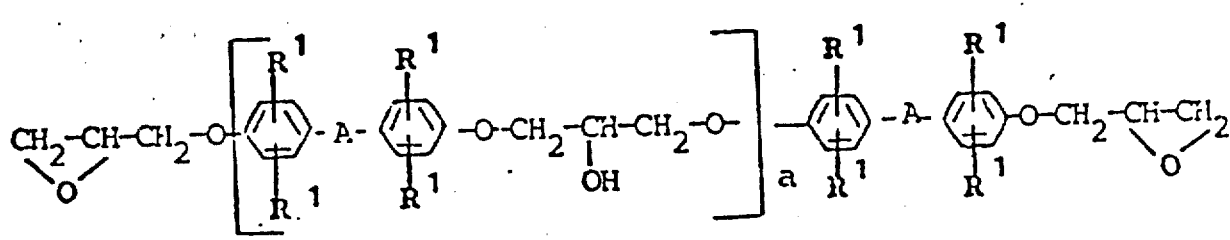

Signed and Sealed this

Twenty-fourth Day of July 1984

[SEAL]

Attest:

GERALD J. MOSSINGHOFF

Attesting Officer    Commissioner of Patents and Trademarks